Z. KEOUGH.
AUTOMOBILE DIRECTION INDICATOR.
APPLICATION FILED DEC. 8, 1913.
1,147,950. Patented July 27, 1915.
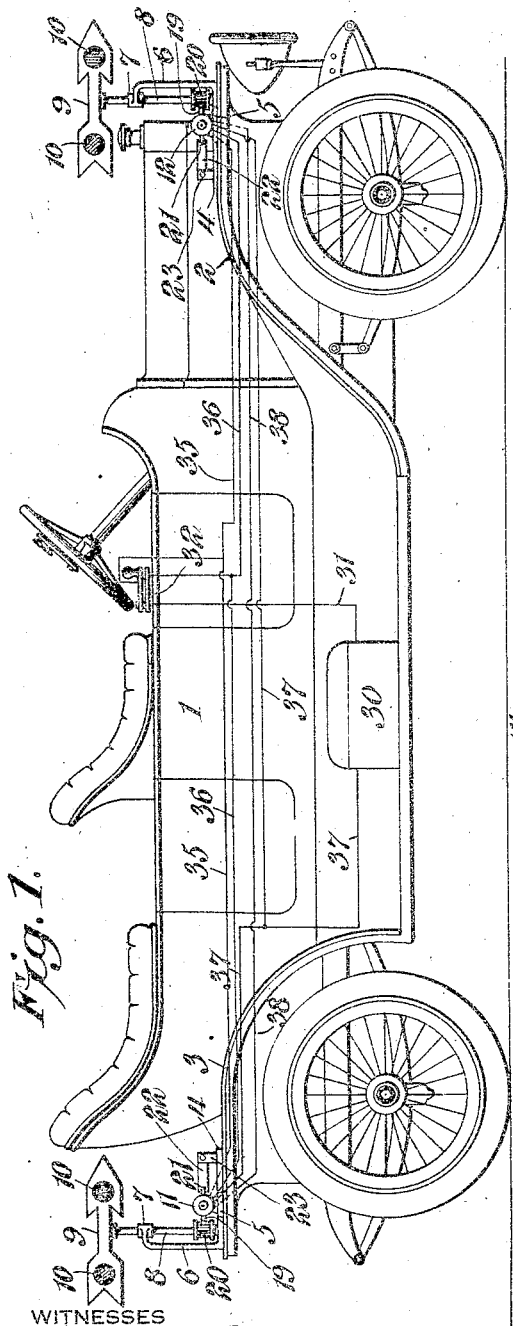
Zachariah Keough, INVENTOR,

UNITED STATES PATENT OFFICE.

ZACHARIAH KEOUGH, OF LOS ANGELES, CALIFORNIA.

AUTOMOBILE DIRECTION-INDICATOR.

1,147,950.  Specification of Letters Patent.  Patented July 27, 1915.

Application filed December 8, 1913. Serial No. 805,354.

*To all whom it may concern:*

Be it known that I, ZACHARIAH KEOUGH, a citizen of the United States, residing at Los Angeles, in the county of Los Angeles and State of California, have invented a new and useful Automobile Direction-Indicator, of which the following is a specification.

This invention has reference to improvements in automobile direction indicators, and its object is to provide means for indicating the direction it is intended the automobile shall take, which means will be responsive to electric actuating devices under the control of the operator of the automobile.

In accordance with the present invention there is provided a device having a normal tendency to maintain a neutral position indicative of the straight-ahead travel of the automobile. Means are also provided for actuating the indicating device to either side in a manner to indicate the intended deviation of the travel of the vehicle, and such means is electrically controlled by electrical devices in turn controlled by a switch device which may be located within easy reach of the operator of the vehicle.

The present invention is particularly useful in connection with the automobile direction indicator illustrated in application No. 787,932, filed by me on September 3, 1913, wherein there is shown a mechanically controlled indicating device preferably of arrow shape and arranged to be turned to point in one direction or the other, as desired, to show the intended course of the vehicle, the arrow indicator being provided with head and feather lights of appropriate color, so that the indicator may be useful at night when the shape of the arrow is invisible, as well as in daylight when the lights are not employed, but dependence is had upon the shape of the indicator for showing the intended direction of travel.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is a side elevation of an automobile with the improved direction indicator installed, the electric circuits being shown diagrammatically. Fig. 2 is a plan view with some parts in section of the electric actuating devices for the indicator. Fig. 3 is a longitudinal section through one of the solenoids and its core, employed in connection with the indicator and showing one position of the parts. Fig. 4 is a view partly in plan and partly in section of the structure of Fig. 3 but showing another position of the parts.

Referring to the drawings, there is shown in Fig. 1 an automobile 1 which may be considered as typical of any suitable automobile and detail description thereof is unnecessary. Mounted upon the front and rear wheel guards 2 and 3, respectively, of the automobile is a base plate 4 having oppositely directed side extensions 5, while at one end intermediate of the extensions 5 there is an upstanding post 6 terminating in a bearing 7 for a shaft 8 which may be considered as stepped in the plate 4, and at the upper end carries a direction indicator 9 shown as shaped like an arrow with lenses 10 at the respective head and tail ends, which lenses are assumed to be backed up by electric lamps for showing lights at night, and the lenses 10 may be of appropriate colors, say, red and green, the red being located in the head of the arrow and the green in the tail end of the arrow, thus apprising a person upon whom the vehicle is advancing, or one following the vehicle that it is about to turn in the direction indicated by the red light, or, in day time, by the head of the arrow. The arrow is to be taken as typical of any suitable direction indicating device, and, therefore, the invention is not confined to such particular arrangement, nor need the arrow be proportionately as large as would appear from the showing of Fig. 1. Furthermore, while the wheel guards provide convenient places for the mounting of the front and rear direction indicators, it will be understood that these indicators may be otherwise mounted, if desired. For instance, they may be mounted in the longitudinal center line of the vehicle instead of at one side thereof. These are matters which may be left to the choice of the manufacturer or owner of the vehicle.

Carried by the side extensions 5 are solenoids 11, 12, respectively, the two solenoids being in alinement and each provided with an axial sleeve 13 projecting at the ends beyond the respective heads of the solenoid, and at one end the sleeve is freely open, while at the other end it is provided with a closure 14 which may be integral with the sleeve, and through this closure is a small passage 15. Communicating at one end with the sleeve 13 at an intermediate point of the latter is a passage 16, the other end of which is freely open to the atmosphere.

The freely open ends of the two sleeves 13 are directed one toward the other, and entering these sleeves through the open ends is a tube 17 constituting a core or armature common to the two solenoids and constructed to slide freely, yet snugly, lengthwise of the respective sleeves, and the solenoids are so spaced and the core 17 is of such length that at all times the core will remain in both sleeves.

At an intermediate point of the core there is secured thereto an arm 18 extending transversely of the core. At one end the arm carries a rack 19 in mesh with a pinion 20 on the shaft 8, while at the other end the arm is formed into a fork 21, the two branches of which are curved so as to present the convex surfaces one toward the other in relatively close relation. Entering the fork between its branches is the free end of a spring 22 and the other end of the spring is fixedly secured to a post 23 rising from that end of the base plate 4 remote from the post or standard 6. The spring 22 is so arranged as to tend constantly to maintain the arm 18, and therefore the core 17, in a centralized position. The rack 19 and pinion 20 are so related that when the arm 18 and core 17 are in the centralized position, the indicator 9 points straight ahead, and this is the neutral position of the arm in which it is normally held by the spring and to which the arm returns after having been moved from the neutral position and then released to the action of the spring.

In each end of the tubular core 17 there is lodged a plug 24, the showing of Fig. 3 where a single plug is shown, being indicative of either end of the core. Axially through the plug 24 there is formed a passage 25 and what constitutes the outer end of this passage is formed into a valve seat for a valve 26 having a stem 27 extending through the passage 25 into the interior of the core 17 and there surrounded by a light spring 28 tending to hold the valve in the closed position.

Automobiles are customarily provided with a battery indicated at 29 in Fig. 2, and usually inclosed in a box 30 as indicated in Fig. 1. From one side of the battery there is carried a conductor 31 to the arm of a switch 32 which may be of the double-throw type with contacts 33, 34. The contact 33 is connected by a conductor 35 to one side of a solenoid 11 and the contact 34 is connected by a conductor 36 to one side of the solenoid 12, and the other side of the solenoid 12 is connected by a conductor 37 to the other side of the battery 29. That side of the solenoid 12 remote from the connection with the conductor 35 is connected by a conductor 38 to the side of the battery remote from that connected to the arm of the switch 32. The circuit connections described have been confined to the indicator at one end of the vehicle, but it will be understood that the several conductors 36 to 38 are carried to the indicator at the other end of the vehicle, the arrangement being such that when the switch is moved on to, say, the contact 33, the solenoids 11 at the two ends of the vehicle on the same side of the vehicle are energized, while when the switch arm is moved on to the contact 34 the solenoids 12 of the indicators at the front and rear of the machine are energized. The interior of the core 17 is in constant communication with the atmosphere at some point between its ends, which point may be a midpoint, by a passage 39.

When the parts are at rest with the indicators pointing straight ahead, the core 17 is so located that its ends are related to the corresponding passages 16, so that there is free atmospheric connection with the chambers formed between these ends and the closed ends 14 of the sleeves 13. Suppose that the arm of the switch 32 is moved on to the contact 34, then the solenoid 12 at each end of the vehicle is energized, while the solenoid 11 at each end of the vehicle remains dead. The core 17 is by the energization of the solenoid 12 caused to move into the solenoid and at once closes the passage 16. The valve 26 being normally closed by the spring 28 prevents escape of air trapped between the passage 16 and the closed end 14 of the sleeve 13 through the passage 25 into the interior of the core, whereupon the air so trapped becomes compressed by the continued movement of the core and acts as an air cushion, the pressure being slowly relieved by escape of air through the small passage 15, after the manner of a dash pot. The two indicators are, therefore, turned slowly to the desired position to show to observers the intended course of the vehicle. Now when the circuit at the switch 32 is broken the spring 22 which has been put under tension by the active solenoid, causes the return of the core 17 to its central or neutral position, and this action is not materially retarded by the air since the valve 26 readily opens to permit the free flow of air from the interior of the core into the chamber between the respective end of the core and the closed end of the sleeve 13, but the return of the core 17 to its neutral position may be slightly retarded by the valve 26, so that the return of the arrow to its neutral position may be at a relatively slow speed and thereby preventing it from overriding the neutral position.

If it be considered that the arrow is turned in the opposite direction to that first considered, there is no resistance to the movement of the core 17 at the end remote from the one acted upon by the energized solenoid because of the presence of the passage 16, nor is there any dash pot action at the inactive end of the core when the core is returned to the neutral position, for the air in front of the core finds ready escape through the then open passage 16. The electrically operated actuating means for the indicators in no wise interferes with the operation of the electric lamps which it is assumed are installed in the arrow in the manner described in the aforesaid application.

With the invention of the present application installed in an automobile, the operator has but to move the switch to one side or the other with so little effort as to be unnoticeable, and as an electric switch may be installed almost anywhere it may be so situated that the operator can move it with a single finger without removing the hand from the steering wheel. In Fig. 1 the switch 32 is shown as without support, but it will be understood that in an automobile it is installed wherever found most convenient.

An audible signal such as an electric bell or buzzer or the like indicated at 38 in Fig. 2 may be provided so as to sound when the direction signal is set, to thereby call attention thereto. Many automobiles are equipped with an electrically operated alarm device and such device may be operated by the movement of the switch arm 32 to either active position to then close the main circuit of such alarm device by way of a branch 39 led off of such main circuit and provided with spaced contacts 40 in the path of the switch arm 32.

What is claimed is:—

1. In a direction indicator for automobiles, electric means for operating the same comprising oppositely disposed solenoids each formed with an axial guiding sleeve in alinement with that of the other and having one end freely open and the other end closed except for a small opening, a hollow core common to the solenoids and entering the freely open ends of the sleeves, said core being provided with valved passages at the ends, and spring means acting on the core to normally hold it in a centralized position and yieldable to movements of the core, each sleeve being provided with an opening communicating with the atmosphere at a point adjacent to the corresponding end of the core when the latter is in the neutral position.

2. In a direction indicator for automobiles, electric means for operating the same comprising oppositely disposed solenoids each formed with an axial guiding sleeve in alinement with that of the other and having one end freely open and the other end closed except for a small opening, a hollow core common to the solenoids and entering the freely open ends of the sleeves, said core being provided with valved passages at the ends, and spring means acting on the core to normally hold it in a centralized position and yieldable to movements of the core, each sleeve being provided with an opening communicating with the atmosphere at a point adjacent to the corresponding end of the core when the latter is in the neutral position, and the hollow core being also provided with a free opening to the atmosphere.

3. In a direction indicator for automobiles, an operating structure therefor comprising a base plate, a standard erected thereon, a shaft mounted in the standard, solenoids mounted on the base plate on opposite sides thereof and each provided with an axial sleeve having one end freely open and the other end closed except for a small opening, a hollow core common to the solenoids and entering the open ends of the sleeves, said core having an outwardly opening valve at each end and an intermediately located passage freely opening to the atmosphere, connections between the core and shaft for rotating the latter by longitudinal movements of the core, said connections including an arm with a forked end, and a spring mounted at one end on the base plate and at the other end lodged in the fork of the arm.

4. In a direction indicator for automobiles, oppositely disposed alined solenoids each provided with an axial sleeve having one end freely open and the other end closed except for a small passage, each sleeve having an intermediately located passage open to the atmosphere, a hollow core having its ends entering the freely open ends of the sleeves and reciprocable between the solenoids, said core being of a length substantially equal to the distance between the intermediate openings of the alined sleeves, and also provided with one way valves at the ends and with an intermediate opening to the atmosphere, and yieldable means constraining the solenoids to a centralized or neutral position.

5. In a direction indicator for automobiles, means for operating the indicator comprising alined solenoids with a core common to both, each solenoid having a sleeve surrounding the core with the end remote from that entered by the core provided with a restricted opening to the atmosphere and at an intermediate point provided with a relatively free opening to the atmosphere in the path of the core to be opened and closed thereby, said core being hollow with valved openings at the ends entering the respective solenoids and with free communication from its interior to the atmosphere, means constraining the core to a central or neutral position, and electric circuit connections for the energization of either core and the deënergization of both at will.

In testimony, that I claim the foregoing as my own, I have hereto affixed my signature in the presence of two witnesses.

ZACHARIAH KEOUGH.

Witnesses:
 EARLE JAMES BLAKESLEE,
 LAUREL STEWART BLAKESLEE.